(12) United States Patent
Halonen et al.

(10) Patent No.: US 7,542,779 B2
(45) Date of Patent: Jun. 2, 2009

(54) COMMUNICATION SYSTEM

(75) Inventors: Timo Halonen, Espoo (FI); Fabio Longoni, Malaga (ES); Juan Melero, Espoo (FI); François D'Argence, Espoo (FI); Arto Ta Kangas, Espoo (FI)

(73) Assignee: QUALCOMM Incorporated, San Diego, CA (US)

( * ) Notice: Subject to any disclaimer, the term of this patent is extended or adjusted under 35 U.S.C. 154(b) by 660 days.

(21) Appl. No.: 10/398,718

(22) PCT Filed: Oct. 9, 2001

(86) PCT No.: PCT/IB01/02222

§ 371 (c)(1), (2), (4) Date: Jan. 26, 2004

(87) PCT Pub. No.: WO02/32174

PCT Pub. Date: Apr. 18, 2002

(65) Prior Publication Data

US 2004/0132486 A1 Jul. 8, 2004

(30) Foreign Application Priority Data

Oct. 9, 2001 (GB) ..................... 0024705

(51) Int. Cl.
*H04W 72/00* (2006.01)
*H04W 4/00* (2006.01)

(52) U.S. Cl. .................. 455/552.1; 455/450; 455/436

(58) Field of Classification Search ............... 370/352, 370/328, 329, 331, 347, 442, 552.1, 450, 370/452.1, 452.2, 509; 455/552.1, 450, 442, 455/452.1, 452.2, 509
See application file for complete search history.

(56) References Cited

U.S. PATENT DOCUMENTS

| 5,034,993 | A | 7/1991 | Sasuta et al. |
| 5,175,867 | A | 12/1992 | Wejke et al. |
| 5,509,051 | A | 4/1996 | Barnett |
| 5,530,917 | A | 6/1996 | Andersson et al. |

(Continued)

FOREIGN PATENT DOCUMENTS

EP 0 496 061 A1 7/1992

(Continued)

OTHER PUBLICATIONS

Nevdyaev, L.M., "*3rd Generation Mobile Communication*" Communications and Business, 2000, pp. 121 and 154.

(Continued)

*Primary Examiner*—Melur Ramakrishnaiah
(74) *Attorney, Agent, or Firm*—Alodeliah Katloab; Darren M. Simon

(57) ABSTRACT

A communication system, said system arranged to provide communication coverage over an area, said system comprising a plurality of first means, each of said first means controlling at least one parameter and/or configuration setting with respect to an area smaller than said coverage area and second means for receiving information from a plurality of said plurality of first means and for controlling at least one parameter and/or configuration setting with respect to the area associated with at least one of said plurality of said plurality of first means.

33 Claims, 6 Drawing Sheets

U.S. PATENT DOCUMENTS

| | | | |
|---|---|---|---|
| 5,708,975 | A | 1/1998 | Heiskari et al. |
| 5,828,963 | A | 10/1998 | Rahman |
| 6,078,817 | A | 6/2000 | Rahman |
| 6,278,701 | B1 | 8/2001 | Ayyagari et al. |
| 6,574,475 | B1 | 6/2003 | Suzuki |
| 6,690,939 | B1 | 2/2004 | Jonsson et al. |
| 6,771,964 | B1 | 8/2004 | Einola et al. |
| 6,792,284 | B1 | 9/2004 | Dalsgaard et al. |
| 2002/0176382 | A1 | 11/2002 | Madour et al. |
| 2003/0076803 | A1 | 4/2003 | Chuah |

FOREIGN PATENT DOCUMENTS

| | | | |
|---|---|---|---|
| JP | 2000 278735 | | 10/2000 |
| JP | 2000278735 | A * | 10/2000 |
| WO | WO 96/06512 | | 2/1996 |
| WO | WO 98/59513 | | 12/1998 |
| WO | WO 99/08407 | | 2/1999 |
| WO | WO 01/35692 | A1 | 5/2001 |

OTHER PUBLICATIONS

Mende et al, "Mobile Radio Network Management Supported by a Planning Tool", IEEE Network Operations and Management Symposium, IEEE, vol. Conf. 10, pp. 483-492, 1998.

Inoue, et al., "Performance Analysis of Microcellular Mobile Communication Systems", Vehicular Technology Conference, 1994 IEEE 44th Stockholm, Sweden, Jun. 8-10, 1994, pp. 135-139/.

Rozenstrauch, et al., "2 Phase RF Channel Allocation", Mar. 1, 1995, Motorola Technical Developments, vol. 24, pp. 70-71.

* cited by examiner

COMMUNICATION SYSTEM

FIELD OF THE INVENTION

The present invention relates to a communication system.

BACKGROUND OF THE INVENTION

In a typical cellular wireless network, the area covered by the network is divided into a number of cells. Each cell is served by a base transceiver station which transmits signals to and receives signals from terminals located in the respective cell associated with a particular base transceiver station. The terminals may be mobile stations which are able to move between cells.

Management of the radio resources (and any other network resource) is normally done in a distributed way in the current networks. In particular, it is the responsibility of the controller of a base station to control the resources of its own base station. In the GSM (Global System for Mobile Communications) standard, a base station controller (BSC) is arranged to control a set of base stations. In the proposed third generation system using CDMA (Code Division Multiple Access), a radio network controller (RNC) is arranged to control the resources of its own base stations. In the CDMA system, the base station is sometimes referred to as Node B. However in this document the term base station will be used. The controllers in both of these systems are arranged to control a number of base stations. However the number of base stations which are controlled are relatively small. Accordingly, with this approach the efficiency of any resource management function or algorithm is limited by the fact that the coordination of the usage of the resource is possible only within the controller's own limited resources.

A further problem is that the algorithms used by the controllers use information received via the existing interfaces of the controller, and the possibility of transferring new information or measurements is restricted. This would require either the modification of the existing standard interfaces or the provision of new interfaces. It would not be practical to implement this on all of the controllers of a network.

The problems described previously will become more relevant in the future. This is because in the newly designed network architectures, most of the radio resource control functions are moved from the controllers, such as the radio network controller and the base station controller, to the base station in order to allow the implementation of a more efficient real time RT algorithm. One example of a function which can be advantageously be done in the base station rather than in the base station controller is channel assignment. An example of such an architecture is that proposed for IP RAN (internet protocol radio access network). This means that the area controlled by the controlling entity is reduced from the base station controller or radio network control area (which encompasses the area covered by a number of base stations) to only the coverage area of a single base station.

The limitations of the radio controller boundaries also have particular relevance when a network operator owns more than one radio access system (for example a CDMA system and a GSM system) with a common coverage area. This is because there is a need for a common management and coordination of the allocation of resources of the different system so that multimode terminals can be controlled to use the optimum one of the access systems. A multimode terminal is able to access both access systems. The use of controllers such as base station controllers, radio network controllers or base stations themselves will not permit the advantages of multimode terminals to be fully realised. The number of network operators who will use more than one radio access system is expected to increase drastically, given current developments. In addition to third generation systems such as CDMA, other systems such as Wireless LAN (local area network), IS-41 (a US version of CDMA), etc are being developed.

A distributed management of the resources, such as currently used, has a further disadvantage in that it does not allow overall control of the Quality of Service offered to the end user. This is because the distributed resource managers have control of only part of the resources that has an impact on the quality of service for an end user.

Distributed management of the resources, such as in the known systems, also has limitations in terms of operability. This is because the introduction of new features and the changing of existing parameters has to be done by accessing each one of the distributed control entities (for example the radio network controller, the base station controller or base station). The different entities may be provided by different manufacturers and so have different user interfaces.

There is a further problem with the arrangement described previously. In particular, in a network, the handover decision (i.e. the decision if and to which cell the handover shall be performed for a terminal) is based on terminal measurements and other mobile station specific information as well as some static handover parameter and target cell information set via operation and maintenance (this latter parameter is normally originated by radio network planning tools). This handover mechanism has the following drawback. The handover decision cannot take into account the dynamic information of all of the target cells unless all of them are controlled by the same controller. The dynamic information may be for example the cell load, the channel availability, the interference level, or the like. In the case of handover from one radio access system to another, the candidate target cells are controlled by different controllers. The handover decision cannot be taken based on dynamic parameters unknown to the controller, such as load of other network elements, transport load, CN (Core network) load or the like.

SUMMARY OF THE INVENTION

It is an aim of embodiments of the present invention to address one or more of the above mentioned problems.

According to a first aspect of the present invention, there is provided a communication system, said system arranged to provide communication coverage over an area, said system comprising a plurality of first means, each of said first means controlling at least one parameter and/or configuration setting with respect to an area smaller than said coverage area and second means for receiving information from a plurality of said plurality of first means and for controlling at least one parameter and/or configuration setting with respect to the area associated with at least one of said plurality of said plurality of first means.

According to a second aspect of the present invention, there is provided a communication system, said system arranged to provide communication coverage over an area, said system comprising a plurality of first means, each of said first means controlling at least one parameter and/or configuration setting for a part of said system and second means for receiving information from a plurality of said plurality of first means and for controlling at least one parameter and/or configuration setting in the part of the system associated with at least one of said plurality of said plurality of first means.

According to a third aspect of the present invention, there is provided a controller for use in a communication system, said system arranged to provide communication coverage over an area, said system comprising a plurality of first means, each of said first means controlling at least one parameter and/or configuration setting with respect to an area smaller than said coverage area, said controller comprising means for receiving information from a plurality of said plurality of first means and means for controlling at least one parameter and/or configuration setting with respect to the area associated with at least one of said plurality of said plurality of first means.

According to a fourth aspect of the present invention, there is provided a method for use in a communication system, said system arranged to provide communication coverage over an area, said method comprising:

receiving information from a plurality of first means system, each of said first means controlling at least one parameter and/or configuration setting with respect to an area smaller than said coverage area; and controlling at least one parameter and/or configuration setting in the area associated with at least one of said plurality of first means in accordance with the received information.

BRIEF DESCRIPTION OF THE DRAWINGS

For a better understanding of the present invention and as to how the same may be carried into effect, reference will now be made by way of example to the accompanying drawings in which.

DESCRIPTION OF PREFERRED
EMBODIMENTS OF THE PRESENT
INVENTION

Figure 1:
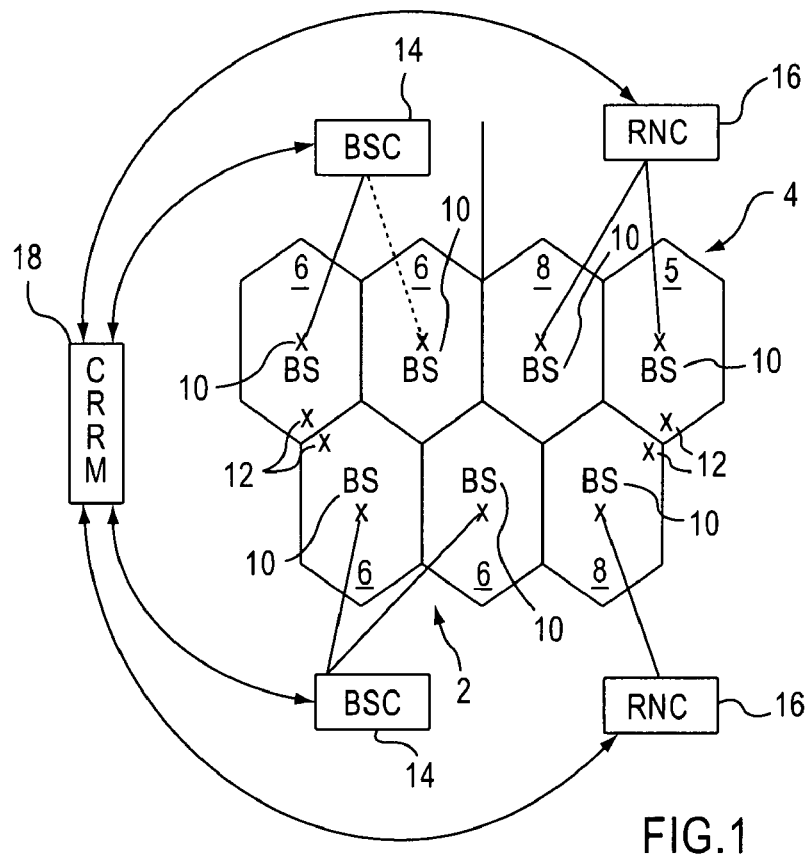
FIG. 1 shows first and second radio access systems using a common radio resource manager.

Reference is first made to FIG. 1 which shows a first radio access system 2 which operates in accordance with the GSM standard and a second radio access system 4 which uses code division multiple access. For clarity, the radio access systems are shown as covering adjacent areas. In practice, the two radio access systems may partially or completely overlap. The area covered by each radio access system is divided into a plurality of cells 6 and 8 respectively. The cells of the respective radio access systems may have the same or different boundaries where there is overlap between the radio access systems. Each of the cells 6 and 8 is served by a respective base station 10. The base stations are each arranged to communicate with mobile stations 12 or any other suitable terminal.

The base stations 10 of the GSM radio access system are arranged to be controlled by respective base station controllers 14. In the example shown in FIG. 1, each base station controller 14 is arranged to control two base stations. In practice, each base station controller 14 may control more than two or less than two base stations. The base stations 10 of the CDMA access system are arranged to be controlled by respective radio network controllers 16. One radio network controller 16 is shown as controlling two base stations whilst the other radio network controller is shown as controlling a single base station. This is by way of example only and each controller may be responsible for one, two or more base stations.

The base station controllers 14 and the radio network controllers 16 are each connected to a common radio resource manager CRRM 18. The function of the CRRM 18 will be described in more detail hereinafter. In alternative embodiments of the present invention, the CRRM 18 may be connected directly to each of the base stations. In yet another alternative embodiment of the present invention, the CRRM 18 is connected to network elements upstream of the base station controllers and the radio network controllers such as mobile services switching centres or higher level elements. In all cases, the CRRM 18 is arranged to receive data relating to all of the cells. Additionally, the CRRM 18 can receive data relating to other network elements, such as switches. For example the CRRM 18 can receive congestion information about switches.

The CRRM 18 is designed to have simple interfaces with the controllers which can provide the CRRM 18 with the information that is required for the CRRM to perform the resource management algorithms. The interfaces are intended to be flexible, so that they can permit new parameters to be acquired if it is desired that the new parameter be used in a new or existing CRRM function. It is preferable that no modification to the other network elements be required as this will make the modification of the resource management easy to achieve. The interfaces are also intended to be compatible with equipment made by other vendors, so that the CRRM 18 can be connected to equipment provided by other vendors. The interface may have a standard construction with an application layer and a transport layer. This type of construction is well known and will not be described in further detail.

Via those interfaces the CRRM 18 provides functions that can be grouped into the following areas:

Coordination of the use of the radio resources from different radio access systems Coordination of the use of the radio resources from different areas of the same radio access system Coordination of the use of resources other than radio resources such as core network resources, transport resources, switches, hardware and/or software processors, transport and/or transmission equipment, databases or the like.

Coordination of the use of all the resources (radio and non radio) affecting the Quality of Service of one connection These functions are executed in one centralized network element, the CRRM 18. This increases the operability advantages, since it is possible via the interface to enable easy configuration (and upgrading) of the CRRM functions and algorithms as required.

In alternative embodiments of the present invention, the CRRM is not a single physical entity as described above. Rather the CRRM is implemented by distributing the functionality in different physical network elements. For example the functionality could be implemented in one or more of the following network elements:

base station controller; radio network controller; and IP based base stations. These entities are by way of example only and the functionality may be implemented in any other entity.

The distributed elements would use the interfaces described previously for the signalling to/from those distributed entities.

Figure 7:
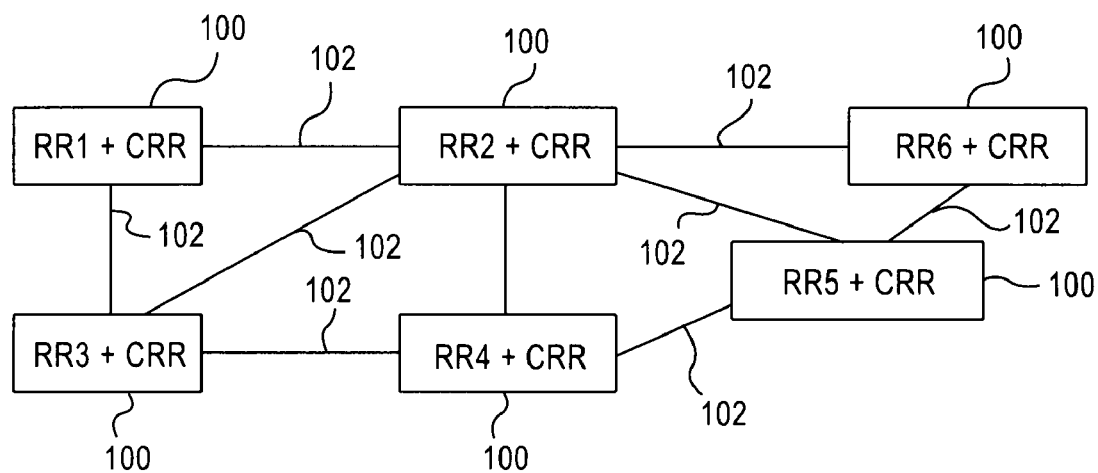
FIG. 7 shows a block diagram of a CRRM implemented in a distributed manner.

Reference is made to FIG. 7 which shows an example of how the functionality of the CRRM can be implemented in a distributed manner. There are six entities 100, which can be any of the network elements discussed above. The entities 100 are interconnected via connections 102. As can be seen from FIG. 7, each entity 100 is connected to a plurality of the other entities 100 but not to every other entity. In some embodiments of the invention, each entity 100 may be connected to every other entity 100 but this can result in an excessive number of connections. In alternative embodiments of the invention, each entity may be connected to only one other entity. However this can increase considerably the signalling traffic in the network, and also may make the CRRM functions very slow. By having each entity connected to several others of the entities, but not every one, a reasonable compromise can be achieved between the number of connections and the speed of the CRRM function. Each of the entities would carry out its normal function which may include obtaining, generating or providing information which is used in a CRRM function. That information may be forwarded to one or more of the other entities. In some cases that information will be forwarded to further ones of the entity. Likewise each entity will also receive information. The most appropriate entity 100 will make the CRRM decision based on information which that entity has. This may take into account the information from the entity itself and at least one other entity. Some of the decisions made by the CRRM functionality of the entity will only take into account information from that entity 100. It should be appreciated that information can be processed in two or more of the entities and that processed information may be used by the CRRM functionality of one of the entities. This alternative may be advantageous for the realization of features that require large amount of processing.

The function of the Common Radio Resource Manager is to act as a policy manager for the access to the resources required by the radio bearers. By coordinating the use of radio and non radio resources, the capacity of the radio access system or systems may be increased.

Figure 2:
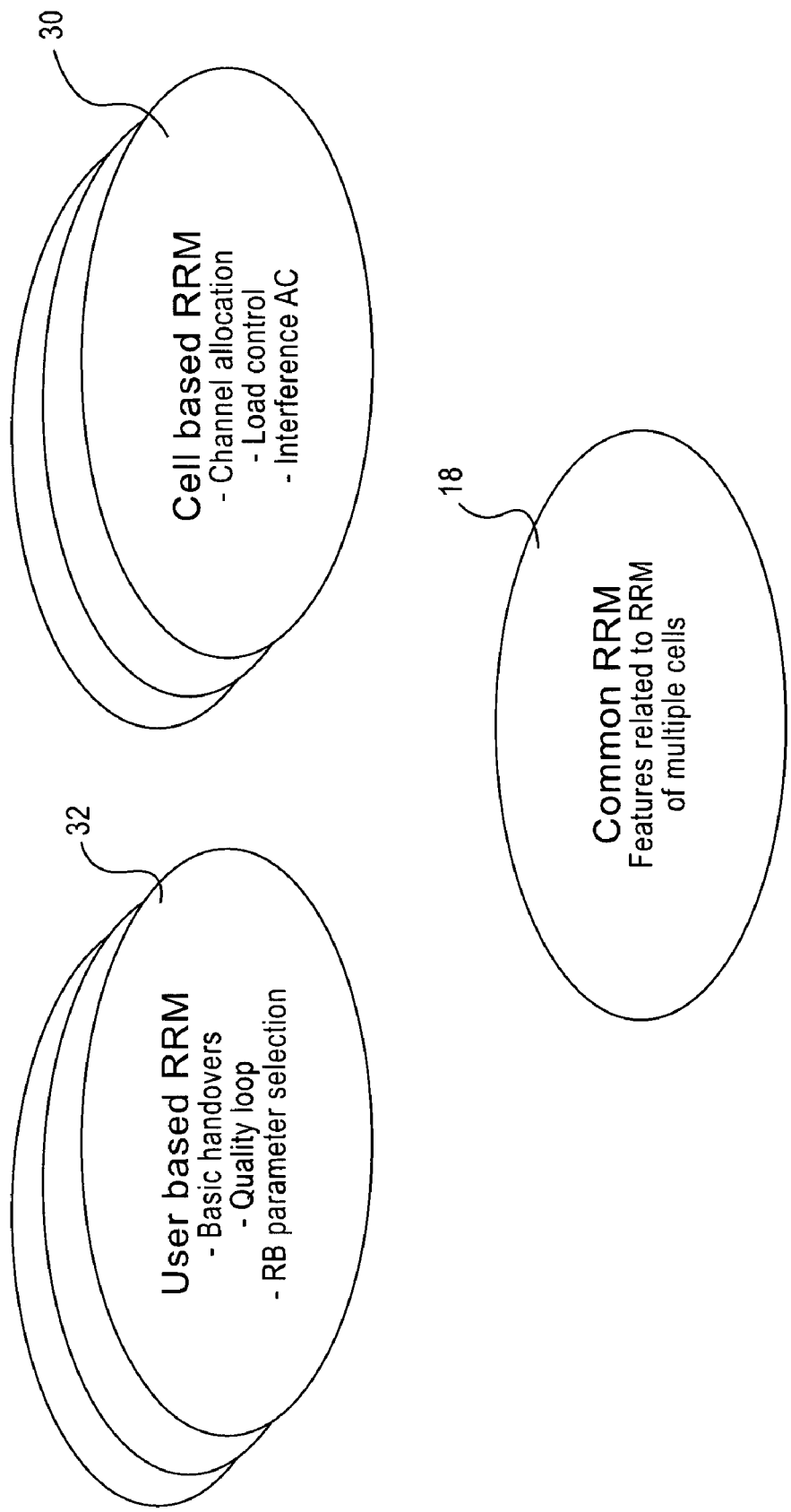
FIG. 2 shows schematically the relationship between CRRM, cell level radio resource management and user level radio resource management.

Reference is made to FIG. 2 which shows schematically the relationship between CRRM 18, cell level radio resource management 30 and user level radio resource management 32. The CRRM 18 functions differ from the distributed resource management functions executed by the cell level radio resource management 30 (user level radio resource management 32), because in the cell level RRM and user level RRM the resources of one cell and user respectively are managed independently from the resource utilised by other cells and users respectively. In particular, the control at the cell level is managed by the cell level-radio resource management 30 whilst the control at the user level is managed by the user level radio resource management 32. The cell level radio resource management controls channel allocation, loading in the cell and admission control based on interference. The cell level radio resource management thus manages algorithms relating to the cell.

The user level radio resource management controls basic handovers, the quality loop and the radio bearer parameter selection. The user level radio resource management tends to control parameters not related to the cell such as call set up. The CRRM 18 controls the features of radio resource management relating to multiple cells. The cell and user level resource management functions are provided in the base station controller, the radio network controller and/or the base station.

The cell level radio resource manager thus makes decisions relating to the radio resource for a given user using only the information relating to the cell in which the user is currently located. The user level radio resource manager thus makes decisions relating to a given user using information relating to that user only. In both of these cases only information from one of the radio access systems can be used. The CRRM will use information from a number of cells which can be from one or more different radio access systems. Even where information from a single radio access system is used, more information from different cells will be available than for decisions made by the cell and user level radio resource managers.

Common radio resource manager functions are different from the resource management functions executed in the Operating support system (OSS). The OSS may be connected to the base station controllers and radio network controllers. The OSS may have direct or indirect connections to all network elements. The OSS operates to provide a long term correction of network parameters using statistical analysis of performance, while the resource management provided by the CRRM 18 has a more rapid response time (in the order of the duration of a call). OSS can also be referred to as Network Management system (NMS).

Self regulation features can either be implemented via CRRM or OSS, depending on the required response time. Self regulation refers to the capability of the network to autonomously tune, that is change the value of, some parameters and configuration settings according to the load and radio conditions currently encountered. In practice, various measurements, counters and/or statistics are used to analyse the current conditions and to trigger when needed, appropriate modifications of the relevant parameters and/or of the network configuration.

Figure 3:
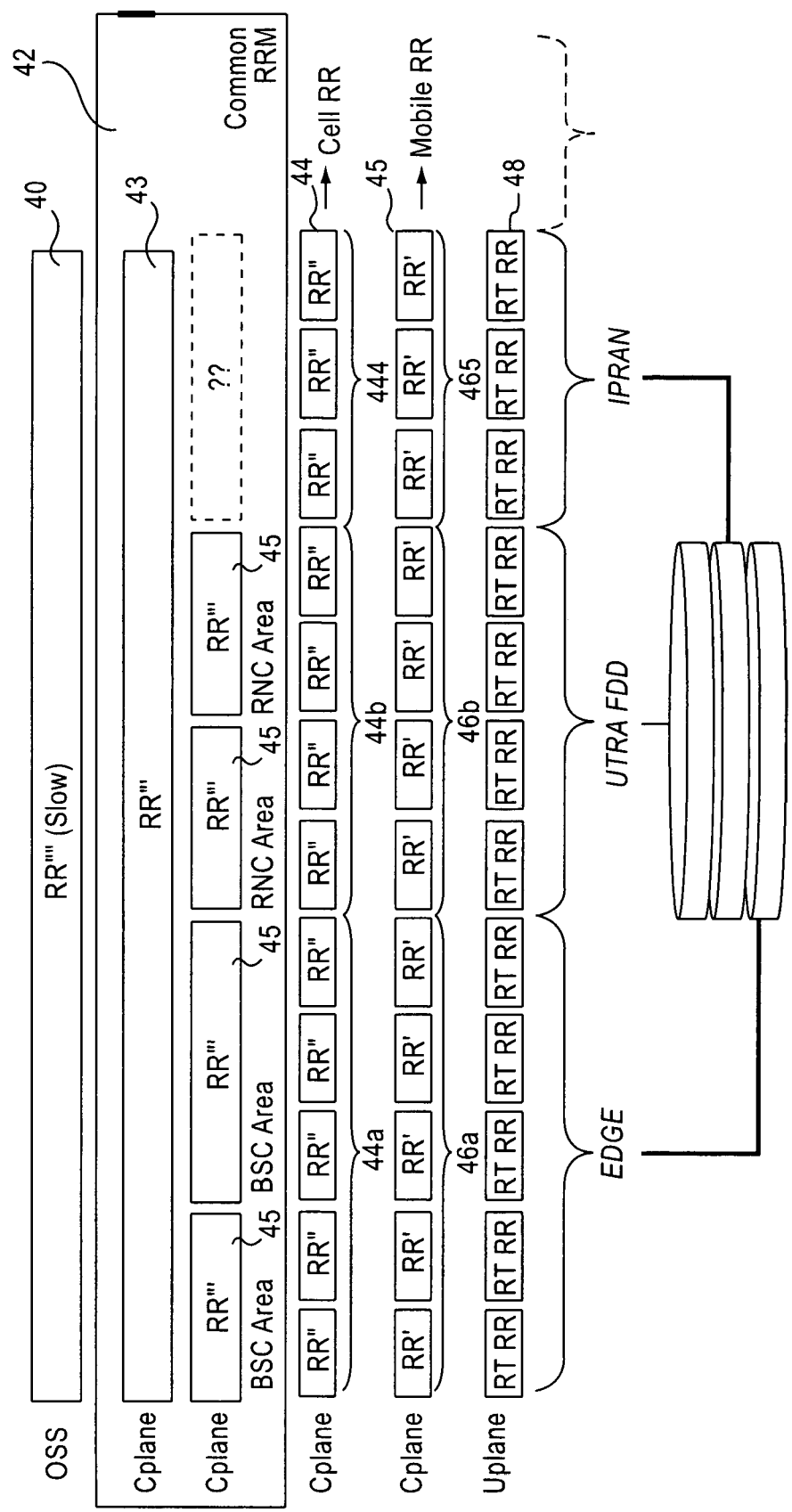
FIG. 3 shows the radio resource hierarchy.

Reference is made to FIG. 3 which shows the hierarchy of the resource management functions. The OSS functions 40 have the highest hierarchy level. This means that decisions made by the OSS overrule any other radio resource decision. The CRRM function 42 has the next highest hierarchy level and over rides radio resource decisions made by lower levels. The CRRM function 42 can be regarded as having two levels 43 and 45. The higher level 43 makes decisions which take into account the conditions in cells using different radio technologies (and belonging to a number of base station controller areas and radio network controller areas). The lower level 45 makes decisions within one radio access technology, that can also be at the base station controller area, the radio network controller area or the like. The next level 44 has the functions of the cell level radio resource management. A separate function is provided for each radio access system. In the arrangement of FIG. 2, there are three functions, one 44a for a GSM radio access system using EDGE modulation, one 44b for a third generation system using Frequency Division Duplexing (FDD) and one 44c for a third generation system using IP based radio access network. The next level 46 has the function of the user level radio access management and again a separate function is provided for each of the different radio access systems discussed in relation to the cell level radio resource management layer. The cell and user level radio resource management layer positions may be reversed in alternative embodiments of the present invention. Finally, the user plane 48 has the lowest hierarchy level. The user plane allows the data to be put into a format so that it can be transmitted over the air interface. The user plane also provides functions such as fast power control and fast scheduling of data for shared channels. The user plane thus provides radio link control in the radio network controller and medium access control.

Figure 4:
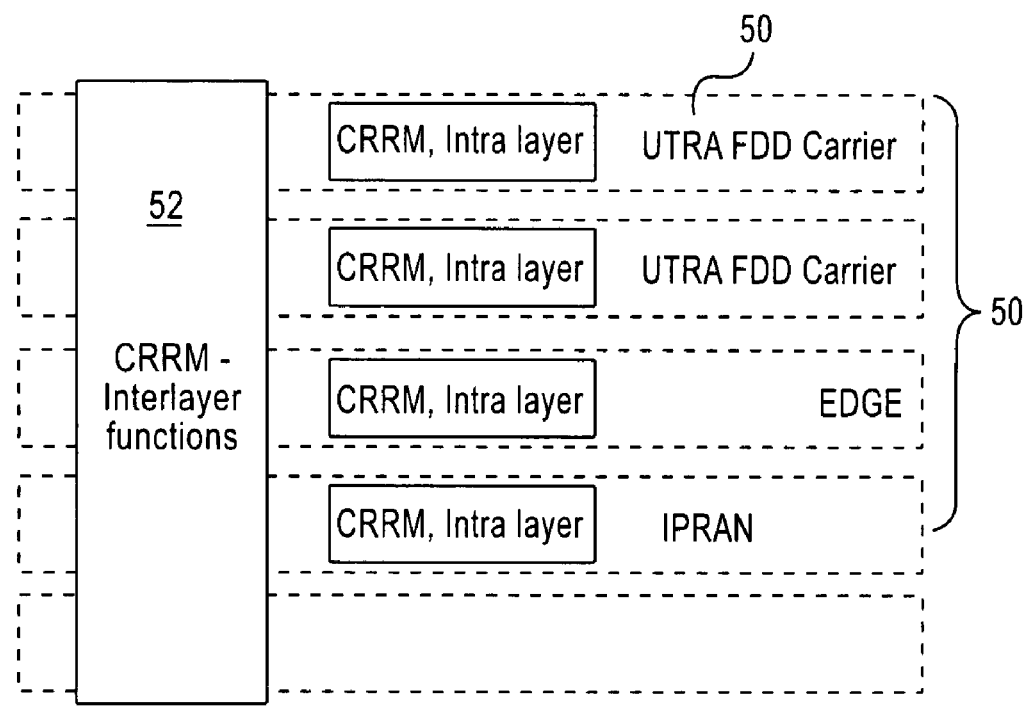
FIG. 4 shows the division of the CRRM into intra and interlayers.

The functions and features supported by the CRRM can be subdivided in intra-layer functions 50 and inter-layer functions 52. This is shown diagrammatically in FIG. 4. The intra layer functions 50 includes the functions that coordinates the use of resources which interfere with each other (for example one radio frequency band) and the latter including the functions that coordinates the use of resources not directly interfering with each other. In other words the intra-layer functions allows the co-ordination of the resource allocation among interfering entities (i.e. users and cells using the same carrier(s)). Those functions normally control the channel allocation and the intra layer handover. It should be appreciated that separate intra layer functions 50*a-d* are provided for each of the different radio access systems. Layers 50*a* and *b* are provided to support the FDD radio access system. Two layers are provided to deal with, for example, micro and macro cells. Layers 50*c* and 50*d* support the EDGE radio access network and the IP based radio access networks respectively. Each of the intra layer functions is arranged to control radio resource allocation within the radio access system associated with the respective radio access system.

The inter layer functions 52 allows the co-ordination of the resource allocation among non interfering entities. Those functions are normally controlling the idle mode cell selection, the cell reselection and the inter layer handover. In other words the inter layer functions take into account the conditions in at least two of the radio access systems or layers when making a decision.

The separation of the inter layer and intra layer functions are advantageous in that the two classes of function have different processing requirements and may require different implementations (for example a centralised network element may provide the inter layer functions and a distributed implementation may be used for the intra layer functions).

Figure 5:
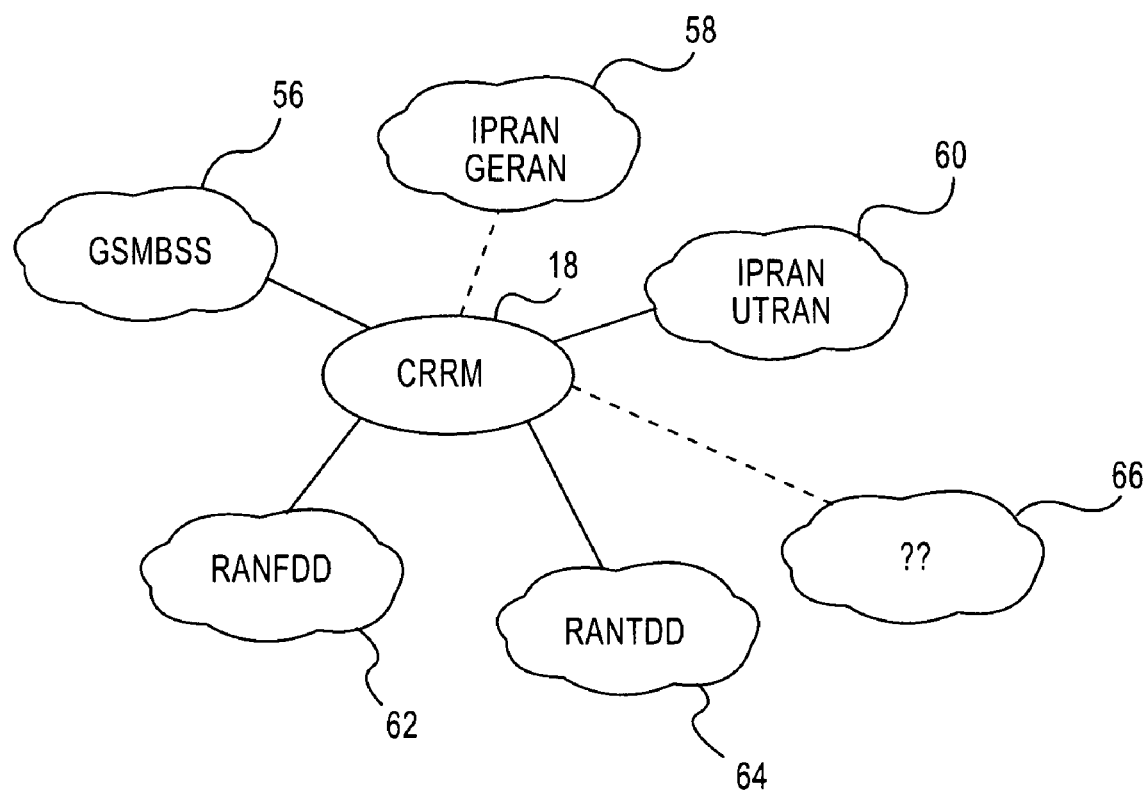
FIG. 5 shows a model of where a single CRRM is used with a number of different radio access systems.

Reference is made to FIG. 5 which shows a single CRRM 18 which is arranged to work with a number of different radio access networks. In the arrangement shown in FIG. 5, the radio access systems are as follows:

A GSM radio access system 56 with the base station subsystem being connected to the CRRM;

An IP based GSM EDGE based radio access network 58 connected to the CRRM 18;

An IP based UMTS terrestrial radio access network 60 connected to the CRRM 18;

A RAN (radio access network) 62 using FDD connected to the CRRM 18;

A RAN (radio access network) 64 using TDD connected to the CRRM 18; and

Any other radio access network 66 which could be supported (for example WLAN IEEE802.11b, WLAN IEEE802.11a, HiperLAN/2, CDMA 2000, UWC.136 or the like).

Radio resource allocation decisions are made by the CRRM taking into account the conditions in one or more of these radio access systems. If the decision only uses information from one of the access systems, then an intra layer decision is being made. If the decision is being made based on information in more than one radio access system, then an inter layer decision is being made.

Figure 6:
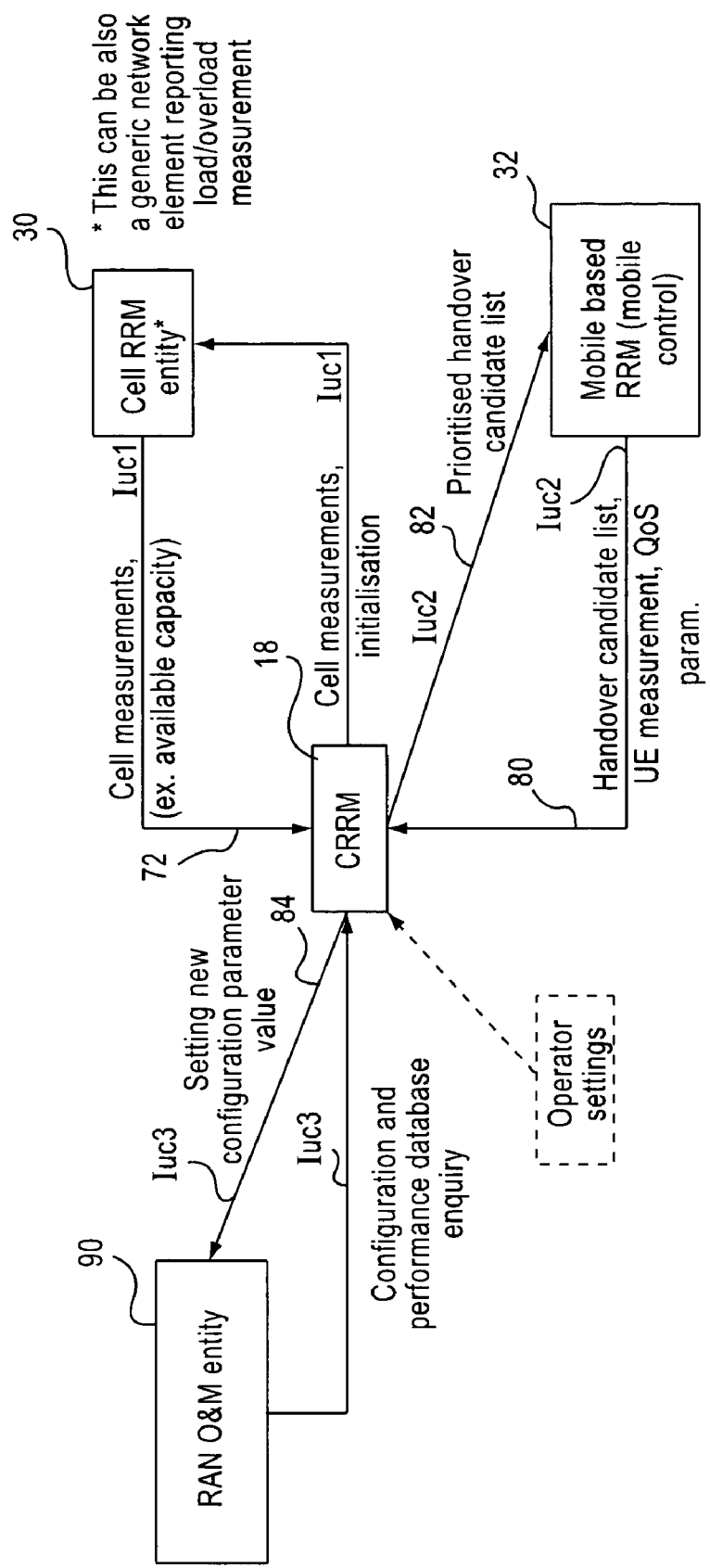
FIG. 6 shows a model of the CRRM and in particular, the inputs received by the CRRM.

Reference is made to FIG. 6 which shows a model of the CRRM with the various inputs received by the CRRM. The RAN O&M 90 as well as the cell level and mobile level radio resource managers 30 and 32 are all incorporated in the radio network controller (in case of UMTS Terrestrial Radio Access Network—UTRAN, release-99) or the base station controller (in case of GSM/EDGE BSS Release-99). In this case, a single interface between the CRRM and the RNC or BSC is required. However it should be appreciated that in some other radio access networks, these elements may be in different network elements. The CRRM performs the following four basic actions (or a subset of them):

Action 1. Cell Status Retrieval Via Input 72:

CRRM makes a request to the relevant entity (for example to the cell level radio resource managers in an IP RAN network or the like) for information about the cell status which is received via input 72. The CRRM can also request other information from remote network elements such as:

the server status. The server status may for example be the server's operational status;

the loading of a core network element which is received. The loading can be a parameter such as bit rate which gives an indication as to the loading of the element; and the transport network status.

The exact information that is required depends on the specific functions implemented in the CRRM, but only one common mechanism to retrieve this information is designed. The mechanism used to retrieve this information can take any suitable form and may for example be that used in the third generation standard for the measurement procedure in Iub and/or Iur or can use a database enquiry mechanism. The use of a single mechanism does not prevent the CRRM from obtaining, with the same mechanism, status of entities other than cells (for example switches, network elements NE, etc.). Periodical or event triggered mechanisms for the retrieval of the information are used. For example a report can be provided in response to a request or can be generated in response to the occurrence of an event or after an elapsed time.

Action 2: Prioritisation on the Candidate Target Cell List a list of candidate target cells for one mobile are sent to the CRRM via input 80 from the user level radio resource manager together with quality of service parameters and other information about the mobile station or user equipment in question. The CRRM, using an internal algorithm which takes into account the status of the target cells, returns a prioritised target cell list to the mobile station via output 82. For example a mobile station may have two target base stations. The CRRM is able, via the cell measurement received as per action 1, to ascertain that one of the targets is overloaded and accordingly prioritise the mobile station to the target which is not overloaded.

Action 3: Fast tuning of RAN configuration parameters. Based on the retrieved cell status information, the CRRM sets (via O&M Server in IP RAN) the cell selection/reselection and other cell/RAN configuration parameters. This is provided by output 84. Based on, for example, load measurement received as described in action 1, the CRRM can tune the idle mode parameters and thus control the idle mode behaviour of a mobile station and which cell the mobile station listens to The 'operator setting' shown represents the initialisation of the CRRM, and may for example what its behaviour should be. It is the same initialisation and parameter setting that is normally done to equipment.

Three interfaces are defined: Iuc1 is to/from the cell level radio resource manager 30, Iuc2 is to/from the user level resource manager 32 and Iuc3 to/from O&M entity 90. Using the first interface, the CRRM requests and obtains from the cell level radio resource manager 30 information on the cell performance. Using the second interface, the CRRM obtains information relating to candidate cells and radio access bearer RAB parameters from the user level resource manager 32. The CRRM calculates the prioritized candidate list which is sent to the user level radio resource manager via the second interface. The CRRM receives via the third interface information relating to the network configuration and performance.

Only a subset of those interfaces may be implemented (for example the third interface can be avoided in some implementations of the CRRM).

The CRRM can control intra and intersystem handover in a system where there is more than one radio access system.

The CRRM is connected via open interfaces to the necessary radio access network components. Furthermore in order to allow the interoperation among different radio access systems, the CRRM can be connected with different access systems by either designing standard interfaces for each radio technology or by an interface common to all radio access systems.

This centralized (or common) resource control works accordingly to the following steps:

1 The CRRM receives the load information from wherever is necessary (the base station or the base station controller), via its interfaces. If necessary the CRRM may request the relevant entity as to which kind of information is needed, and what the reporting method shall be. The CRRM receives this information via input 72 of FIG. 6. The information requested and transmitted can be any information or measurement that enables the CRRM to understand the capacity available in the network element, and the quality of service that it can offer to a mobile station (in terms of throughput, delay, etc).

2a The CRRM receives from the local entity responsible for the handover decision (for example the base station controller in a GSM system, a RNC in UTRAN system, a user level radio resource controller in an IP RAN system) the handover candidate list, together with measurements made by the mobile station or other user equipment, classmark information for the mobile station or other user equipment and, optionally the quality of service parameters of the connections that the mobile station or other user equipment UE requires from the network. This is received via input 80 of FIG. 6. The local handover control entity does not have necessarily to send the handover candidate list to the CRRM at every handover, since some (simple) handover decision can be taken locally. The criteria for the CRRM enquiry for the handover decision shall be defined. One possible criteria is that the handover candidate list is sent to the CRRM only if it contains a target candidate that belongs to another system (or layer) than the one in use. In case that the base station controller or the radio network controller is the source of information, another criteria can be that an entity sends the handover candidate list to the CRRM if the list contains at least one candidate target that is not controlled by the base station controller or radio network controller.

2b The CRRM prioritises the candidate or selects the target based on its own algorithms and information, and returns the new list back to the distributed handover control entity via output 82 of FIG. 6. This can also be used for the channel allocation function, i.e. information about the channel to be used within the cell is also returned by the CRRM. Robustness can be added to the system by defining that if no response is received from CRRM, the local handover control entity takes the handover decision locally.

3a. In order to allow the CRRM to get more complete information on the radio access network(s) that it is connected with, the CRRM can make an enquiry to the configuration and performance databases of the RAN(s) via output 84. The configuration database provides the values of configuration parameters that are relevant for the CRRM operation (such as the parameters used for the idle mode cell selection and reselection). The second database provides information about the performance of the network, in order to allow the CRRM to run a network optimisation algorithm that enables, by changing network configuration parameters or by redirecting the terminals to other cells, an improvement in the network performance. The information is retrieved via an open interface to the network element NE responsible for the setting of those parameters in the system (for example the BSC in a GSM system, RNC in a UTRAN system, or a generic O&M Server in IP-based RAN).

3b In order to control the access to the system for an idle mode terminal or to control the cell reselection process, the CRRM, based on the load information (received as in step 1), sets and changes parameters that are used for cell selection/reselection (for example the parameters that are broadcast to the mobile station). The new parameters are signalled via an open interface to the network element NE responsible for the setting of those parameters in the system (for example the BSC in a GSM system, RNC in UTRAN, or a generic O&M Server in IP-based RAN).

The invention claimed is:

1. A system for radio resource management in a cellular network comprising:

a plurality of first controllers, each of said first controllers configured to control at least one parameter and/or configuration setting with respect to an area smaller than a coverage area of said system and encompassing an area covered by a plurality of base stations; and a second controller configured to receive information from said plurality of first controllers and configured to control at least one parameter and/or configuration setting, in the duration of a call, with respect to the area associated with at least one of said plurality of first controllers.

2. An apparatus for radio resource management in a cellular network comprising:

a receiver configured to receive information from a plurality of entities, wherein each of said entities controls at least one parameter and/or configuration setting for a respective part of a system, each of said parts encompass an area covered by a plurality of base stations; and a controller configured to control at least one parameter and/or configuration setting, in the duration of a call, in the part of the system associated with at least one of said plurality of entities.

3. An apparatus for radio resource management in a cellular network comprising:

a receiver configured to receive information from a plurality of entities, wherein each of said entities controls at least one parameter and/or configuration setting with respect to an area smaller than a coverage area of a system and encompasses an area covered by a plurality of base stations; and a controller configured to control at least one parameter and/or configuration setting, in the duration of a call, with respect to the area associated with at least one of said plurality of entities.

4. The apparatus as claimed in claim 3, wherein said controller is configured to have a first mode of operation in which said at least one of said plurality of entities controls said at least one parameter and/or configuration setting and a second mode in which said controller is configured to control said parameter and/or configuration setting.

5. The apparatus as claimed in claim 4, wherein said second mode is used only if conditions in at least one area controlled by one of said plurality of entities affects at least one parameter and/or configuration setting in an area controlled by another of said entities.

6. The apparatus as claimed in claim 3, wherein the area associated with at least two of said entities at least partially overlap.

7. The apparatus as claimed in claim 3, wherein said controller is provided in a network element.

8. The apparatus as claimed in claim 7, wherein said controller and at least one of said plurality of entities is provided in the same network element.

9. The apparatus as claimed in claim 3:
wherein a plurality of different access systems each comprise one or more of said plurality of entities.

10. The apparatus as claimed in claim 9, wherein said controller has a first mode of operation in which said controller is configured to receive information from a two or more of said plurality of entities, said two or more entities being associated with only one of said access systems and a second mode of operation in which said controller is configured to receive information from a two or more of said plurality of entities, said two or more entities being associated with a plurality of said access systems.

11. The apparatus as claimed in claim 9, wherein the area covered by at least two of said plurality of different access systems is at least partially the same.

12. The apparatus as claimed in claim 9, wherein the area covered by each of said plurality of different access systems is different.

13. The apparatus as claimed in claim 3, wherein said system comprises a cellular system.

14. The apparatus as claimed in claim 13, wherein said receiver is configured to receive information relating to at least one cell parameter.

15. The apparatus as claimed in claim 14, wherein said at least one cell parameter comprises at least one of the following cell resource status, server status, cell loading, cell performance, and quality of service available.

16. The apparatus as claimed in claim 13, wherein said receiver is configured to receive information relating to at least one user equipment parameter.

17. The apparatus as claimed in claim 16, wherein said at least one user equipment parameter comprises:
a list of candidate cells, at least one quality of service parameter required by the user equipment, measurements made by the user equipment, parameters relating to the user equipment, and a classmark of the user equipment.

18. The apparatus as claimed in claim 13, wherein said controller is configured to control one or more of the following parameters and/or configuration settings,
cell to which a user equipment is assigned or handed off, idle mode, and cell reselection.

19. The apparatus as claimed in claim 13, wherein at least some of said entities are provided in one or more base station controllers.

20. The apparatus as claimed in claim 13, wherein at least some of said entities are provided in one or more radio network controllers.

21. The apparatus as claimed in claim 13, wherein at least some of the information received by the controller is received in response to a request therefrom.

22. The apparatus as claimed in claim 3, wherein said controller is configured to receive further information from another entity, said further information being used to control said at least one parameter and/or configuration setting.

23. The apparatus as claimed in claim 3, wherein said configuration setting and/or parameter comprises resource allocation.

24. The apparatus as claimed in claim 3, wherein said information comprises information on one or more of capacity available and a quality of service that is offered.

25. The apparatus as claimed in claim 3, wherein parameter and/or configuration setting controls a handover of a user equipment.

26. A method for radio resource management in a cellular network comprising:
receiving information from a plurality of entities, each of said entities controlling at least one parameter and/or configuration setting with respect to an area smaller than a coverage area of a system and encompassing an area covered by a plurality of base stations; and
controlling at least one parameter and/or configuration setting, in the duration of a call, with respect to the area associated with at least one of said plurality of entities.

27. The method as claimed in claim 26, wherein said information comprises information on one or more of capacity available and a quality of service that is offered.

28. The method as claimed in claim 26, wherein parameter and/or configuration setting controls handover of a user equipment.

29. The method as claimed in claim 28, wherein said information comprises at least one of a handover candidate list, measurements made by a user equipment, classmark information, and at least one quality of service parameters of that the user equipment requires.

30. The method as claimed in claim 28, wherein in said controlling of said at least one parameter and/or configuration setting comprises sending a list of handover candidates to at least one of said plurality of entities.

31. The method as claimed in claim 26, wherein said controlling of said at least one parameter and/or configuration setting comprises controlling access to the system for an idle mode user equipment and/or controlling a part of an area reselection process.

32. The method as claimed in claim 26, wherein said parameter and/or configuration setting comprises resource allocation.

33. An apparatus for radio resource management in a cellular network comprising:
receiving means for receiving information from a plurality entities, wherein each of said entities controls at least one parameter and/or configuration setting with respect to an area smaller than a coverage area of a system and encompasses an area covered by a plurality of base stations; and
controlling means for controlling at least one parameter and/or configuration setting, in the duration of a call, with respect to the area associated with at least one of said plurality of entities.

* * * * *